United States Patent [19]

Daudelin

[11] Patent Number: 4,486,833
[45] Date of Patent: Dec. 4, 1984

[54] MICROPROCESSOR PERIPHERAL CONTROL CIRCUIT

[75] Inventor: Douglas S. Daudelin, Jackson, N.J.

[73] Assignee: AT&T Bell Laboratories, Murray Hill, N.J.

[21] Appl. No.: 428,874

[22] Filed: Sep. 30, 1982

[51] Int. Cl.³ .............................................. G06F 3/00
[52] U.S. Cl. ................................................... 364/200
[58] Field of Search ........................ 364/200 MS File

[56] References Cited

U.S. PATENT DOCUMENTS 4,050,096 9/1977 Bennett .............................. 364/200

OTHER PUBLICATIONS

Williamson, T., "Avoid Refresh-Timing Conflicts In μC Memory Expansion," *EDN*, Jan. 20, 1982, pp. 117-121.

*Primary Examiner*—Raulfe B. Zache
*Attorney, Agent, or Firm*—David H. Tannenbaum

[57] ABSTRACT

Microcomputers are typically designed having a cycle time during which peripheral devices are accessed. This cycle is subdivided such that during a device access certain signals sequentially are activated to control the flow of data to or from the device over a set of special purpose leads. There is disclosed an arrangement for use when the device cannot respond within the allotted cycle for controlling the device access so that multiple successive cycles are used for a single device access. In this manner the microcomputer's speed is independent from the device response speed.

8 Claims, 5 Drawing Figures

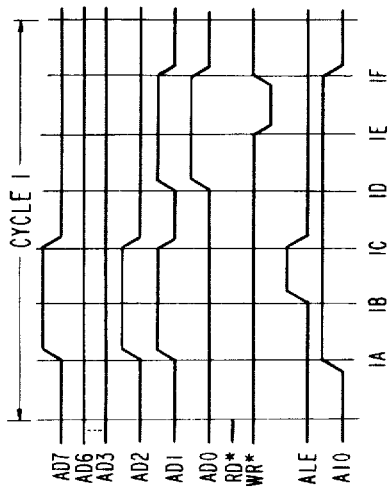
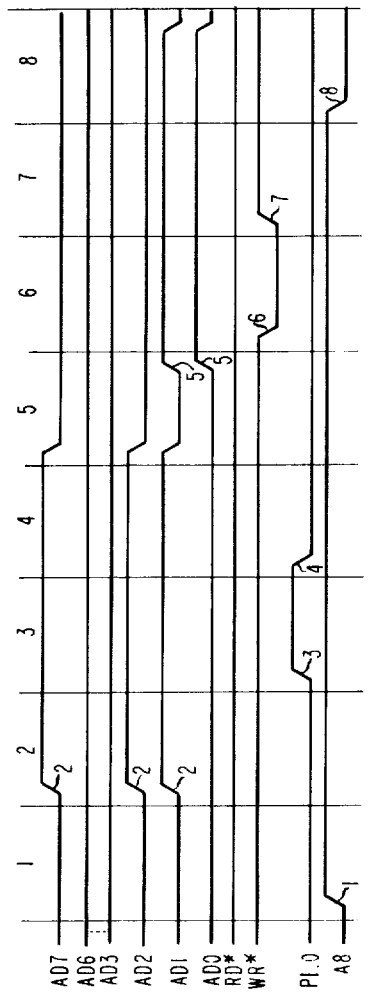

MICROPROCESSOR PERIPHERAL CONTROL CIRCUIT

BACKGROUND OF THE INVENTION

This invention relates to microcomputers and more particularly to a control circuit for adapting microcomputers to operate with peripheral devices having access times slower than the microcomputer cycle time.

Microcomputers are devices which are designed having a number of input and output leads and some internal memory. These devices are usually used as the control system for some other complex equipment. Since a single microcomputer will find application in many diverse systems the microcomputer designer must of necessity arrange the device with a vast generality.

The microcomputer performs its required tasks by executing a user specified sequence of instructions taken from a well defined instruction set provided by the manufacturers of the microcomputer. The execution by the microcomputer of each instruction of the instruction set involves progressing through several pre-established internal machine states under control of an internal clock. These internal machine states are known as microinstructions and are typically built into the structure of the microcomputer. Many micro-instructions are executed to complete the execution of a user specified instruction. The user specified sequence of instructions which the microcomputer will execute may reside in either the internal program memory or in an external program memory or in both.

An important characteristic of microcomputers is the number of input/output (I/O) leads which link them to the external world. Whatever its task, the microcomputer must input and output data and control signals over these leads. Therefore, the number of these leads, and the way in which they can be used, determines the ease with which the microcomputer can be interfaced to a particular application. Typically, these leads are connected to peripheral devices and many signals must be sequentially communicated between the microcomputer and the devices to perform a particular operation with respect to the peripheral devices.

Some microcomputers have been designed in such a manner that certain of the leads are designated as pre-programmed leads. The microcomputer will translate certain single instructions in its basic instruction set into a number of sequential actions involving the pre-programmed leads. The sequence of actions that is invoked over these pre-programmed leads is somewhat standardized, so that a wide variety of commercial peripheral devices, such as memories, can be accessed by the sequence, the entire sequence occurring in one instruction cycle.

Problems, however, occur in situations where a peripheral device reacts slower than the cycle time of the processor.

Typical solutions would be to slow or halt the microcomputer; access the peripheral device twice and ignore the first response; access the peripheral device by connecting it to the microcomputer's general purpose I/O leads and generate the sequential actions under program control using several instruction cycles; or use some external circuit for buffering the data to or from the peripheral device. Slowing the microcomputer is contrary to present trends and has impact on all operations, not just on accesses. Some microcomputers do not have halt capability and thus this option is not possible, and in any event requires external circuitry. Some peripherals cannot tolerate double accesses thereby eliminating that possibility. Using the general purpose input/output leads would require external circuitry to supplement those leads since more general purpose leads are necessary to perform an access than are normally available. Adding external circuitry to control access to peripherals is costly and cumbersome.

Thus, a need exists in the art to allow slow peripheral access under control of a microcomputer having pre-established accessing instructions.

SUMMARY OF THE INVENTION

As the quantity of microcomputer internal memory and program space has increased, the applications that no longer require a standard pre-programmed set of leads have also increased. To make particular microcomputers more attractive to designers with these applications, some manufacturers now give users some independent control over some of the leads of the pre-programmed set of leads.

By taking advantage of the independent control of the pre-programmed leads, it is possible to access some peripherals under complete user control while other peripherals are accessed over the same leads by using the special purpose, single instructions. Thus, instead of using a single pre-established instruction in the microcomputer to control peripheral access during a single microcomputer cycle it is possible for the user to program several instructions to control the same microcomputer leads. While independent lead control requires several computer cycles to complete the task, it has the advantage of being slow enough for any peripheral device while not slowing the computer for the execution of other instructions. This arrangement can be used alternately with standard single pre-established instruction accesses so that faster devices may be accessed by the conventional single user instruction, while slower devices are accessed over the same leads through the execution of several user instructions. Since the timing of the slower device access is precisely controlled by the user, the microcomputer clock can be made totally independent of the access time of the peripheral devices.

By gaining the ability to tailor a microcomputer's I/O to the requirements of a particular user, higher performance specifications can be met on non-slowed accesses. In this manner more powerful microcomputers are possible with fewer interface problems.

BRIEF DESCRIPTION OF THE DRAWING

The invention and its several other objects, features and advantages will be more fully understood from a reading of the following description to one embodiment taken in conjunction with the drawing in which:

FIG. 2 shows the single instruction for one microcomputer necessary to output to a fast device;

FIG. 3 shows a chart of the input/output leads during the execution of the single instruction set; and FIGS. 4 and 5 show the multiple instructions and a chart of the input/output leads for a multiple step set of instructions necessary to output to a slow device.

DETAILED DESCRIPTION

Figure 1:
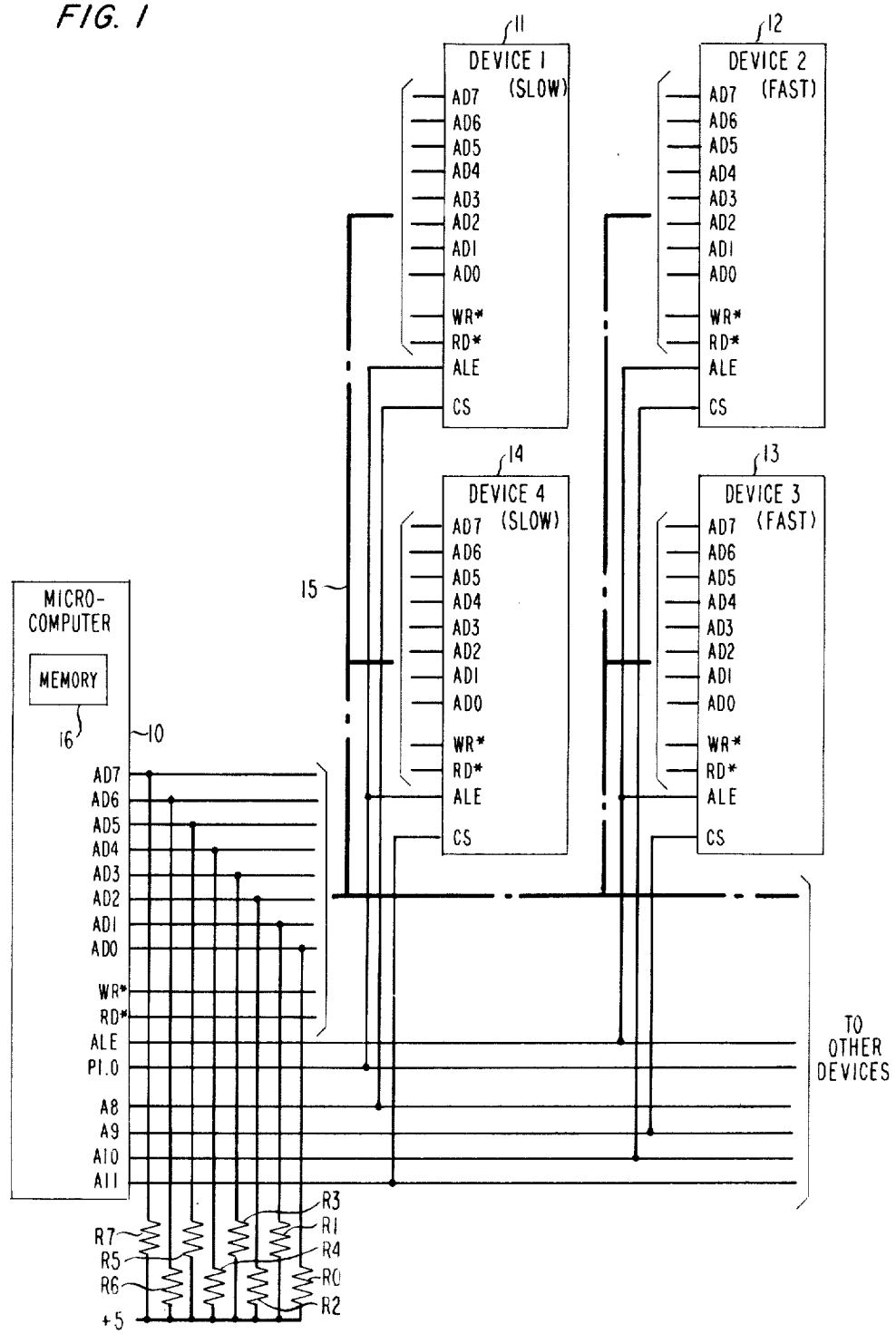
FIG. 1 shows a schematic of a microcomputer and its input/output leads connected to peripheral devices.

FIG. 1 shows the electrical connections necessary to perform alternating fast and slow accesses with a commercial microcomputer (10), such as the Intel 8051. The 8051 allows user programmable control over 18 of its 19 pre-programmed input/output leads. These 18 leads (all not shown) include leads AD0-AD7 which are the lower eight bits of the peripheral device address leads multiplexed with one byte of data. Leads A8-A15 (all not shown) contain the higher eight bits of the peripheral address. Lead RD* indicates an input cycle and instructs the attached devices that it will receive data on its rising edge. Lead WR* controls an output cycle and informs the peripheral devices that data is valid on its rising edge.

These signals can be shared between the four devices shown, two of which 12, 13 are fast enough to handle a one instruction access, and two of which 11, 14 are not. Note that only eight bits of address AD0-AD7 are necessary to specify an internal location in these particular devices, and one of the microcomputer 10's higher order address bits is used to select the particular device desired providing a signal on input CS of the selected device. The pull-up resistors R0-R7 on leads AD0-7 are required to be used on these leads in the programmable mode due to the particulars of the 8051 design.

The signal on pre-programmed lead ALE which specifies when the address is valid on leads AD0-7, is not user programmable. Thus, this lead only extends to the fast response devices 12 and 13. One of the general purpose programmable leads P1.0 is used in place of lead ALE for devices 11 and 14 which are too slow to be accessed by a single pre-established instruction. Other slow or fast devices can be connected to the microcomputer in this same manner.

FIG. 2 shows the single step user specified microcomputer instruction necessary to output the contents of the microcomputer's accumulator to location 86HEX in fast device 12. Prior to writing to device 12, a register (DPTR) in microcomputer (not shown) has been set to a 16-bit value that will raise lead A10. This in turn would raise input CS on device 12. Other bits in the register will specify address 86HEX (86H) via leads AD0-AD7 when lead ALE goes high.

FIG. 3 is a timing diagram where the actions of several micro-instructions (executing as a result of the single user supplied instruction) are shown within a single microcomputer access cycle. At time 1A leads AD1, AD2 and A10 go high to specify location 86H in device 12 (lead A10 is connected to the CS input of device 12). At time 1B lead ALE goes high, and clocks the address into device 12 when it goes low soon after. The address bits are then removed from leads AD1, AD2 at point 1C and data bits from device 12 are placed on the AD-0-AD7 leads. Thus, assuming the accumulator contains the value 03H, then at point 1D leads AD0 and AD1 go high. At point 1E lead WR* goes low in preparation of writing the data. At point 1F lead WR* goes high thereby clocking data (leads AD0-AD7) into device 12 to location 86H. This all oocurs within one instruction cycle under control of a single pre-established instruction.

FIGS. 4 and 5 show a sequence of user supplied instructions which emulate the action of the pre-established micro-instructions above-described but at a much slower rate so as to allow access to slow device 11. The first instruction during cycle 1 places a high on lead A8 which enables device 11's CS lead. The second instruction during cycle 2 places the address of the desired location (86) on the AD0-7 bus. Instructions 3 and 4 toggle lead P1.0 which is device 11's ALE lead to signify that a valid address is present on the bus. Instruction 5 moves the data to be written (the contents of the accumulator =03H) to the AD0-7 bus. Instructions 6 and 7 toggle the WR* lead to tell device 11 that data is present. Instruction 8 removes the select from device 11. Other instructions which do not affect the I/O leads (such as NOP's) can be inserted between these instructions to expand any particular time interval of the access sequence. The instructions which control the slower device access must be located in internal microcomputer memory (16) so as to prevent intervening instruction fetches over the I/O section from interfering with a multiple step peripheral access routine. These instruction sets could be, in turn invoked by a single user instruction, or by multiple user instructions. Similarly, microcomputer interrupts that use the I/O section must be controlled to prevent interference with a multiple instruction access.

CONCLUSION

It should also be noted that the individual instructions of the user controlled instruction sets which are used to control access to the slow devices need not be executed sequentially. Partial accesses may be effected and later completed and the intervening microcomputer operations could include the use of the pre-programmed leads under either user or pre-programmed control.

While a microcomputer has been shown which requires external pull-up resistors on the address data bus to operate those leads in the user programmable mode, it is certainly possible to design a microcomputer that will not require any external circuitry to use the bus in the user programmable mode. Also, it will be advantageous to allow the user to have programmable control over all of the pre-programmed leads including the ALE lead.

What is claimed is:

1. The method of accessing peripheral devices from a microcomputer over pre-programmed leads where the access time of some of the devices is slower than the normal access instruction cycle time of the microcomputer, said method comprising the steps of for certain of said devices applying, during a single instruction cycle of said microcomputer, to said pre-programmed leads certain access control signals timed in accordance with the internal clock of said microcomputer, and for other slower devices, applying to said pre-programmed leads, during a first microcomputer instruction cycle, a first subset of said certain access control signals, and applying to said pre-programmed leads, during subsequent microcomputer instruction cycles, other subsets of said access control signals.

2. The invention set forth in claim 1 wherein said first-mentioned applying step includes the sequencing through a set of pre-established micro-instructions, each micro-instruction controlling signals on said pre-programmed leads, said set of pre-established micro-instructions occurring within a single instruction cycle.

3. The invention set forth in claim 2 wherein said set of pre-established micro-instructions are contained within said microcomputer and invoked under external signal control.

4. The invention set forth in claim 1 wherein said subsets of said access control signals are generated by said microcomputer sequentially during separate microcomputer clock cycles under control of separately provided user instructions.

5. A circuit for accessing peripheral devices from a microcomputer over pre-programmed leads where the access time of some of the devices is slower than the normal access instruction cycle time of the microcomputer, said circuit comprising, first means operative during a single instruction cycle of said microcomputer, for applying to said pre-programmed leads certain access control signals timed in accordance with internal clock of said microcomputer, and second means for applying to said pre-programmed leads, during a first microcomputer instruction cycle a first subset of said access control signals, and for applying to said pre-programmed leads during subsequent microcomputer instruction cycles other subsets of said access control signals.

6. The invention set forth in claim 5 wherein said first means includes means for sequencing through a set of pre-established micro-instructions, each instruction controlling signals on said pre-programmed leads, said set of pre-established micro-instructions occurring within a single instruction cycle.

7. The invention set forth in claim 6 further comprising means for invoking said set of pre-established micro-instructions under external signal control.

8. The invention set forth in claim 6 wherein said second means includes means for controlling said subsets of said access control signals sequentially under separately provided user instructions.

* * * * *